United States Patent
Lien et al.

(10) Patent No.: US 10,319,528 B2
(45) Date of Patent: Jun. 11, 2019

(54) MAGNETIC CAPACITOR ELEMENT

(71) Applicant: Industrial Technology Research Institute, Hsinchu (TW)

(72) Inventors: Chin Lien, Taipei (TW); Cho-Fan Hsieh, Luodong Township (TW); Hung-Sen Wu, Taoyuan (TW); Teng-Chun Wu, Jinning Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/854,360

(22) Filed: Dec. 26, 2017

(65) Prior Publication Data
US 2019/0122824 A1    Apr. 25, 2019

(30) Foreign Application Priority Data
Oct. 24, 2017 (TW) .............................. 106136482 A

(51) Int. Cl.
*H01G 4/33*    (2006.01)
*H01G 4/12*    (2006.01)
*H01G 4/008*   (2006.01)

(52) U.S. Cl.
CPC .............. *H01G 4/33* (2013.01); *H01G 4/008* (2013.01); *H01G 4/1209* (2013.01); *H01G 4/1227* (2013.01)

(58) Field of Classification Search
CPC ............ H01G 4/008; H01G 4/10; H01G 4/12; H01G 4/30; H01G 4/33; H01G 4/005
See application file for complete search history.

(56) References Cited

U.S. PATENT DOCUMENTS 6,187,165 B1    2/2001   Chien et al.
6,759,305 B2    7/2004   Lee et al.
(Continued)

FOREIGN PATENT DOCUMENTS

CN    102365698 A    2/2012
CN    102800493 A    11/2012
(Continued)

OTHER PUBLICATIONS

Cheng et al., "Magnetocapacitance effect in nonmultiferroic YFeO$_3$ single crystal", Journal of Applied Physics, 2012, vol. 111, pp. 034103-1 to 034103-5.

(Continued)

*Primary Examiner* — Nguyen T Ha
(74) *Attorney, Agent, or Firm* — Birch, Stewart, Kolasch & Birch, LLP

(57) ABSTRACT

A magnetic capacitor element is provided. The magnetic capacitor element includes a first electrode, a second electrode, a first dielectric layer, a second dielectric layer, a magnetic layer and an oxide layer. The second electrode is disposed opposite to the first electrode. The first dielectric layer is disposed between the first electrode and the second electrode. The second dielectric layer is disposed between the first dielectric layer and the second electrode. The magnetic layer is disposed between the second electrode and the second dielectric layer. The oxide layer is disposed between the second dielectric layer and the magnetic layer.

11 Claims, 8 Drawing Sheets

(56) References Cited

U.S. PATENT DOCUMENTS

| | | | |
|---|---|---|---|
| 6,934,143 B2 | 8/2005 | Chou et al. | |
| 7,109,545 B2 | 9/2006 | Baker et al. | |
| 7,529,078 B2 | 5/2009 | Wang et al. | |
| 7,663,197 B2 | 2/2010 | Nagase et al. | |
| 7,667,296 B2 | 2/2010 | Stumbo et al. | |
| 7,903,387 B2 | 3/2011 | Masuda et al. | |
| 7,911,187 B2 | 3/2011 | Lai et al. | |
| 8,529,746 B2 | 9/2013 | Grant et al. | |
| 8,802,287 B2 | 8/2014 | Holme et al. | |
| 9,058,885 B2 | 6/2015 | Luo et al. | |
| 9,142,354 B2 | 9/2015 | Chang | |
| 9,263,189 B2 | 2/2016 | Shukh | |
| 9,646,971 B2 | 5/2017 | Im et al. | |
| 9,779,878 B2 * | 10/2017 | Hong | H01G 4/008 |
| 10,026,551 B2 * | 7/2018 | Hsieh | H01G 4/10 |
| 2008/0174936 A1 | 7/2008 | Lai et al. | |
| 2010/0194331 A1 * | 8/2010 | Lai | H01G 4/008 |
| | | | 320/101 |
| 2010/0214718 A1 * | 8/2010 | Yeh | H01G 4/008 |
| | | | 361/305 |
| 2011/0051313 A1 * | 3/2011 | Hwang | H01G 4/20 |
| | | | 361/311 |
| 2012/0099240 A1 | 4/2012 | Chang | |
| 2014/0313637 A1 * | 10/2014 | Shukh | H01G 4/008 |
| | | | 361/523 |
| 2015/0092317 A1 * | 4/2015 | Gabig | H01G 4/008 |
| | | | 361/303 |
| 2015/0371777 A1 | 12/2015 | Hsieh et al. | |

FOREIGN PATENT DOCUMENTS

| | | |
|---|---|---|
| CN | 105071545 A | 11/2015 |
| CN | 106783809 A | 5/2017 |
| TW | 201209863 A1 | 3/2012 |
| TW | 201601175 A | 1/2016 |
| TW | I515889 B | 1/2016 |

OTHER PUBLICATIONS

Liao et al., "The demonstration of colossal magneto-capacitance and "negative" capacitance effect with the promising characteristics of Jg-EOT and transistor's performance on Ge (100) n-FETs by he novel magnetic gate stack scheme design", Symposium on VLSI Technology Digest of Technical Papers, 2014, 2 pages.

Liu et al., "Anomalous high capacitance in a coaxial single nanowire capacitor", Nature Communications, Jun. 6, 2012, pp. 1-7.

Liu et al., "Energy Storage Characteristics of $BiFeO_3$/$BaTiO_3$ Bi-Layers Integrated on Si", Materials, 2016, vol. 9, No. 935, pp. 1-9.

Taiwan Office Action issued in Taiwan Application No. 10820229200, dated Mar. 13, 2019.

* cited by examiner

US 10,319,528 B2

MAGNETIC CAPACITOR ELEMENT

CROSS REFERENCE TO RELATED APPLICATIONS

This application claims priority of Taiwan Patent Application No. 106136482, filed on Oct. 24, 2017, the entirety of which is incorporated by reference herein.

BACKGROUND

Technical Field

The disclosure relates to a magnetic capacitor element and the manufacturing method thereof, and in particular it relates to a magnetic capacitor element having multilayered dielectric layers.

Description of the Related Art

Along with the maturing of renewable energy technology, the development of energy storage systems has also gradually received more and more attention. In general, most conventional energy storage systems use lithium batteries, lead batteries, or flow batteries. However, since these batteries contain chemical electrolytes, they are less safe, have the risk of explosion, and cannot be used under high-temperature conditions. In addition, the power density of secondary chemical batteries is poor, so they are not suitable for use in fast charge and discharge systems.

In view of the above problems, the use of capacitor elements with high power density is considered as a suitable solution. Capacitor elements can be used to store static charges to meet the demand for fast charging and discharging. Currently, the industry has developed a variety of capacitor elements, such as ceramic capacitors, super capacitors, magnetic capacitors, and so on.

However, existing capacitor elements are not satisfactory in all respects. Therefore, how to further improve the performance and stability of the capacitor elements is one of the objectives of the current industry.

SUMMARY

In accordance with some embodiments, the present disclosure provides a magnetic capacitor element. The magnetic capacitor element includes a first electrode, a second electrode, a first dielectric layer, a second dielectric layer, a magnetic layer and an oxide layer. The second electrode is disposed opposite to the first electrode. The first dielectric layer is disposed between the first electrode and the second electrode. The second dielectric layer is disposed between the first dielectric layer and the second electrode. The magnetic layer is disposed between the second electrode and the second dielectric layer. The oxide layer is disposed between the second dielectric layer and the magnetic layer.

In accordance with some embodiments of the present disclosure, the first dielectric layer and the second dielectric layer each include cadmium chromium sulfide ($CdCrS_4$, $CdCr_2S_4$), strontium titanate ($SrTiO_3$), barium titanate ($BaTiO_3$ (BTO)), yttrium ferrite ($YFeO_3$), lead zirconate titanate ($PbZr_xTi_{1-x}$, $0 \leq x \leq 1$), lead lanthanate titanate ($Pb_xLa_{1-x}TiO_3$, $0 \leq x \leq 1$), bismuth ferrite ($BiFeO_3$ (BFO)), bismuth titanate ($Bi_{12}TiO_{20}$, $Bi_4Ti_3O_{12}$, $Bi_2Ti_2O_7$), or a combination thereof.

In accordance with some embodiments of the present disclosure, the first dielectric layer and the second dielectric layer are in contact with each other.

In accordance with some embodiments of the present disclosure, the first electrode, the second electrode, the first dielectric layer, the second dielectric layer, the magnetic layer and the oxide layer are coaxial.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
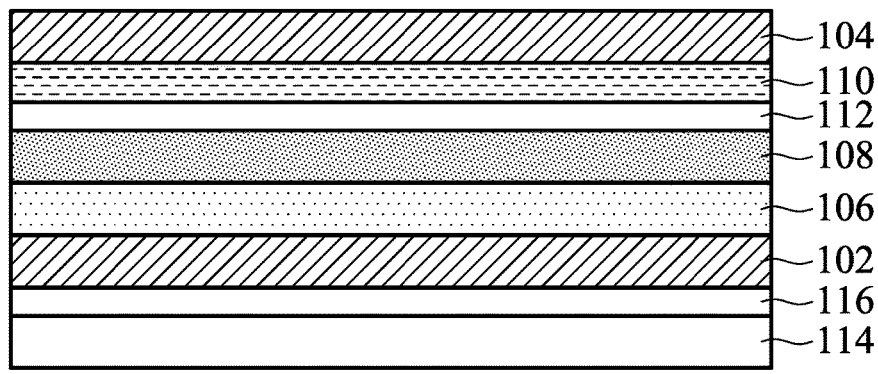
FIG. 1 illustrates a cross-sectional view of the magnetic capacitor element in accordance with some embodiments of the present disclosure.

The magnetic capacitor element and the method of manufacturing the magnetic capacitor element of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

It should be noted that the elements or devices in the drawings of the present disclosure may be present in any form or configuration known to those with ordinary skill in the art. In addition, the expressions "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher". It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

It should be understood that, although the terms "first", "second", "third" etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In general, the capacitor element consists of two metallic layers (the electrodes) and the insulating (dielectric) material formed between the two metallic layers. The capacitor element's ability to store a charge (i.e. the capacitance value of the capacitor element) may calculated by Equation (1).

$$C = \varepsilon A / d \quad \text{Equation (1)}$$

In the above equation (1), C represents the capacitance value of the capacitor element, $\varepsilon$ represents the dielectric constant (permittivity) of the dielectric material, A represents the surface area of the electrode, d represents the distance between the two electrodes. According to Equation (1), it is known that the capacitance value of the capacitor element is proportional to the dielectric constant of the dielectric material and the surface area of the electrode. Taking the above capacitor element as an example, if d is not changed, the capacitance value of the capacitance element may be increased by increasing the dielectric constant of the dielectric material and the surface area of the electrode. In this way, the performance of the capacitor element may also be improved.

The magnetic capacitor element provided by the present disclosure includes a magnetic layer and several ferroelectric dielectric layers. The magnetic layer may produce vertical magnetic moments under the magnetic field and may further induce colossal magnetocapacitance effect (also called magnetodielectric effect). Therefore, the dielectric constant and the breakdown voltage of the magnetic capacitor element may be increased. In addition, when an external electric field is applied, interface charges will be generated among the ferroelectric dielectric layers and an interface charge coupling effect may occur.

The capacitance value and the ability of charge storage of the magnetic capacitor element may be improved by colossal magnetocapacitance effect and interface charge coupling effect. In accordance with some embodiments of the present disclosure, the contact area of the electrode is increased by the three-dimensionally coaxial design. The magnetic capacitor element's ability to store a charge is thereby increased.

FIG. 1 illustrates a cross-sectional view of a magnetic capacitor element 100 in accordance with some embodiments of the present disclosure. The magnetic capacitor element 100 may include a first electrode 102 and a second electrode 104 that is disposed opposite to the first electrode 102. In accordance with some embodiments, the first electrode 102 and the second electrode 104 may be formed of metals. In accordance with some embodiments, metals may include platinum, gold, copper, aluminum, platinum alloys, gold alloys, copper alloys, aluminum alloys, or a combination thereof. In addition, in accordance with some embodiments, the thickness of the first electrode 102 and the second electrode 104 each may be in a range from about 20 nm to about 200 nm. In some other embodiments, the thickness of the first electrode 102 and the second electrode 104 each may be in a range from about 10 nm to about 80 nm.

In accordance with some embodiments, the first electrode 102 and the second electrode 104 may be formed by physical vapor deposition (PVD), chemical vapor deposition (CVD), any other suitable method, or a combination thereof. For example, physical vapor deposition may include sputtering, resistance thermal evaporation, electron beam evaporation or pulse laser deposition and so on. For example, chemical vapor deposition may include low pressure chemical vapor deposition (LPCVD), low temperature chemical vapor deposition (LTCVD), rapid thermal chemical vapor deposition (RTCVD), plasma enhanced chemical vapor deposition (PECVD) or atomic layer deposition (ALD) and so on.

In addition, the magnetic capacitor element 100 may include a first dielectric layer 106 and a second dielectric layer 108. The first dielectric layer 106 may be disposed between the first electrode 102 and the second electrode 104. The second dielectric layer 108 may be disposed between the first dielectric layer 106 and the second electrode 104. In accordance with some embodiments, the first dielectric layer 106 is in contact with the second dielectric layer 108. In some embodiments, the first dielectric layer 106 is in direct contact with the second dielectric layer 108. In accordance with some embodiments, the thickness of the first dielectric layer 106 and the second dielectric layer 108 each may be in a range from about 10 nm to about 1000 nm or from about 100 nm to about 700 nm.

The crystalline phase of the first dielectric layer 106 and the second dielectric layer 108 may include amorphous phase, cubic phase, tetragonal phase, or a combination thereof. In accordance with some embodiments, the first dielectric layer 106 and the second dielectric layer 108 may be formed of ferroelectric dielectric materials. In accordance with some embodiments, the material of the first dielectric layer 106 and the second dielectric layer 108 may include cadmium chromium sulfide ($CdCrS_4$, $CdCr_2S_4$), strontium titanate ($SrTiO_3$), barium titanate ($BaTiO_3$(BTO)), yttrium ferrite ($YFeO_3$), lead zirconate titanate ($PbZr_xTi_{1-x}$, $0 \leq x \leq 1$), lead lanthanate titanate ($Pb_xLa_{1-x}TiO_3$, $0 \leq x \leq 1$), bismuth ferrite ($BiFeO_3$ (BFO)), bismuth titanate ($Bi_{12}TiO_{20}$, $Bi_4Ti_3O_{12}$, $Bi_2Ti_2O_7$), or a combination thereof. In accordance with some embodiments, the materials of the first dielectric layer 106 and the second dielectric layer 108 are different. In accordance with some embodiments, the crystal grain size of the material of the first dielectric layer 106 and of the second dielectric layer 108 each may be in a range from about 50 nm to about 500 nm. In some other embodiments, the crystal grain size of the material of the first dielectric layer 106 and of the second dielectric layer 108 each may be in a range from about 1 nm to about 49 nm.

In accordance with some embodiments, the first dielectric layer 106 and the second dielectric layer 108 may be formed by the above chemical deposition process, the above physical deposition process, spin-on coating, spray coating, any other suitable method, or a combination thereof. In accordance with some embodiments, a sputtering process is used to form the first dielectric layer 106 and the second dielectric layer 108. In the embodiment where the sputtering process is used, the temperature of the substrate may be controlled at about room temperature to obtain an amorphous thin film, while the temperature of the substrate may be controlled to within a range from about 400° C. to about 700° C. to obtain a thin film having a cubic phase or tetragonal phase.

In addition, in accordance with some embodiments, the magnetic capacitor element 100 may include more than two dielectric layers as described above. For example, the magnetic capacitor element 100 may include three or four dielectric layers. It should be noted that internal depletion will occur in the combination of the first dielectric layer 106 and the second dielectric layer 108 of the magnetic capacitor element 100 when an external electric field is applied. As the electric field is increased and full depletion is achieved, interface charges are generated at the interface between the first dielectric layer 106 and the second dielectric layer 108, and more electric dipoles are induced in the dielectric layer. The interface charge coupling effect occurs accordingly.

Furthermore, the magnetic capacitor element 100 may include at least one magnetic layer 110. The magnetic layer 110 may be disposed between the second electrode 104 and the second dielectric layer 108. The magnetic layer 110 may provide a magnetic field for the magnetic capacitor element 100. The magnetic layer 110 may be formed by magnetic materials. In accordance with some embodiments, the thickness of the magnetic layer 110 may be in a range from about 10 nm to about 300 nm, or from about 50 nm to about 300 nm.

In accordance with some embodiments, the material of the magnetic layer 110 may include iron-platinum alloys (FePt), cobalt-platinum alloys (CoPt), or a combination thereof. In accordance with some embodiments, the ratio of the amount of platinum atoms and the total amount of iron atoms and platinum atoms (i.e. [platinum atoms]/[iron atoms and platinum atoms]) in the magnetic layer 110 is in a range from about 40% to about 60%.

In accordance with some embodiments, the magnetic layer 110 may be formed by the above chemical deposition process, the above physical deposition process, spin-on coating, spray coating, any other suitable method, or a combination thereof. In addition, in accordance with some embodiments, an annealing process may be performed after the deposition process so that the magnetic layer 110 may possess better crystallinity and order. For example, the annealing process may be rapid thermal annealing (RTA). In accordance with some embodiments, the annealing process may be performed in the temperature range from about 500° C. to about 800° C.

It should be noted that the magnetic layer 110 is disposed between the second electrode 104 and the first dielectric layer 106 or between the second electrode 104 and the second dielectric layer 108 in the magnetic capacitor element 100 so that vertical magnetic moments may be produced in the first dielectric layer 106 and the second dielectric layer 108 under the magnetic field. Colossal magnetocapacitance may occur accordingly. As such, the dielectric constant and the breakdown voltage value of the magnetic capacitor element 100 may be improved.

Specifically, in cases where a certain magnetic field is applied, the colossal magnetocapacitance effect is substantially proportional to the dielectric constant, as shown in Equation (2).

$$MC\% = \varepsilon(H) - \varepsilon(0)/\varepsilon(0) \qquad \text{Equation (2)}$$

In the above equation (2), MC represents colossal magnetocapacitance, $\varepsilon(H)$ represents the dielectric constant under the magnetic field, and $\varepsilon(0)$ represents the dielectric constant without the magnetic field. Therefore, it is known that the dielectric constant of the magnetic capacitor element 100 may be increased indirectly by having the magnetic layer 110 disposed. The performance of the magnetic capacitor element 100 may also be improved accordingly.

In addition, the magnetic capacitor element 100 may further include at least one oxide layer 112. The oxide layer 112 may be disposed between the second dielectric layer 108 and the magnetic layer 110. In accordance with some embodiments, the oxide layer 112 is in contact with the magnetic layer 110. In some embodiments, the oxide layer 112 directly is in contact with the magnetic layer 110. The oxide layer 112 may assist in the formation of the magnetic layer 110 and may induce vertical alignment in the magnetic layer 110 and prevent the occurrence of leakage current. In accordance with some embodiments, the thickness of the oxide layer 112 may be in a range from about 1 nm to about 20 nm, or form about 5 nm to about 10 nm.

In accordance with some embodiments, the oxide layer 112 may be formed of metal oxides. In accordance with some embodiments, the material of the oxide layer 112 may include magnesium oxide, nickel oxide, lanthanum strontium manganite (LSMO), lead zirconate titanate (PZT), or a combination thereof.

In accordance with some embodiments, the oxide layer 112 may be formed by the above chemical deposition process, the above physical deposition process, spin-on coating, spray coating, any other suitable method, or a combination thereof.

In addition, in accordance with some embodiments, the magnetic capacitor element 100 may further include one magnetic layer 110 between the first electrode 102 and the first dielectric layer 106, and may include one oxide layer 112 between the first dielectric layer 106 and the magnetic layer 110. In other words, in accordance with some embodiments, the magnetic capacitor element 100 may include two magnetic layers 110 and two oxide layers 112, but it is not limited thereto.

As shown in FIG. 1, the magnetic capacitor element 100 may further include a substrate 114. The substrate 114 and the second electrode 104 may be disposed at opposite sides of the first electrode 102. The substrate 114 may be used to support the first electrode 102, the first dielectric layer 106, the second dielectric layer 108, the oxide layer 112, the magnetic layer 110 and the second electrode 104.

The substrate 114 may be formed of semiconductor materials. In accordance with some embodiments, the substrate 114 may be a n-type, p-type or neutral semiconductor substrate. In accordance with some embodiments, the substrate 114 may be a bulk semiconductor substrate, such as a semiconductor wafer. In accordance with some embodiments, the substrate 114 may be formed of elementary semiconductor materials. For example, the elementary semiconductor material may include silicon, germanium or a combination thereof. In accordance with some embodiments, the substrate 114 may be formed of compound semiconductor materials. For example, the compound semiconductor material may include gallium arsenide, silicon carbide, indium arsenide, indium phosphide, gallium nitride, gallium phosphide, indium antimonide, any other suitable compound semiconductor materials, or a combination thereof.

Moreover, the magnetic capacitor element 100 may further include at least one passivation layer 116. The passivation layer 116 may be disposed between the substrate 114 and the first electrode 102. The passivation layer 116 may prevent current short and improve the quality of interface and the adhesion of thin film. In accordance with some embodiments, the magnetic capacitor element 100 may further include two or more passivation layers 116. In accordance with some embodiments, the thickness of the passivation layer 116 may be in a range from about 50 nm to about 1000 nm, or from about 100 nm to about 150 nm.

The passivation layer 116 may be formed of metal oxides, metal nitrides, or a combination thereof. In accordance with some embodiments, the metal oxides or metal nitrides include silicon oxide, titanium oxide, silicon oxide, titanium nitride, tantalum nitride, or a combination thereof.

In accordance with some embodiments, the passivation layer 116 may be formed by the above chemical deposition process, the above physical deposition process, spin-on coating, spray coating, any other suitable method, or a combination thereof.

Next referring to FIGS. 2A-2F, FIGS. 2A-2F illustrate the three-dimensional views of a portion of the magnetic capacitor element 200 in accordance with some embodiments of the present disclosure. It should be understood that although only one capacitor unit 200S of the magnetic capacitor element 200 is illustrated in the figures, the magnetic capacitor element 200 actually may include a plurality of capacitor units 200S formed over the substrate 114 or the passivation layer 116. The capacitor units 200S may be arranged in any suitable way and coupled to the circuit unit. In addition, the same or similar components or elements may be represented by the same or similar reference numerals as described above, the materials, manufacturing methods and functions of these components or elements are the same or similar to those described above, and thus will not be repeated hereafter.

Figure 2A:
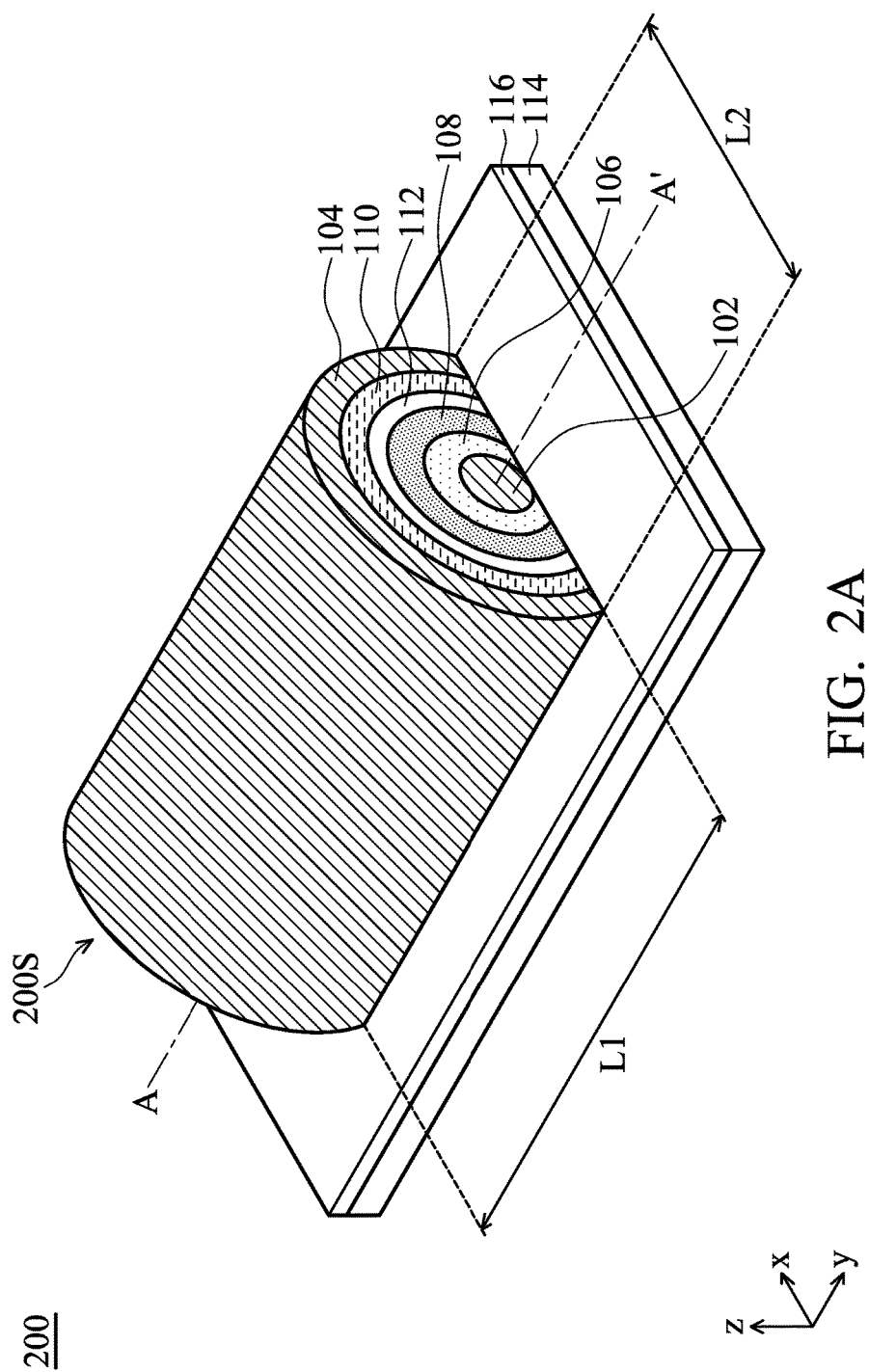
FIGS. 2A-2F illustrate the three-dimensional views of a portion of the magnetic capacitor element in accordance with some embodiments of the present disclosure.

As shown in FIG. 2A, in accordance with some embodiments, the first electrode 102, the first dielectric layer 106, the second dielectric layer 108, the oxide layer 112, the magnetic layer 110 and the second electrode 104 of the capacitor unit 200S of the magnetic capacitor element 200 may be substantially coaxial. Specifically, the sequentially stacked first electrode 102, first dielectric layer 106, second dielectric layer 108, oxide layer 112, magnetic layer 110 and second electrode 104 of the capacitor unit 200S may be substantially three-dimensionally coaxial.

In this embodiment, the first electrode 102 substantially has a cylindrical shape, and the cylinder has an axis A-A'. The first dielectric layer 106, the second dielectric layer 108, the oxide layer 112, the magnetic layer 110 and the second electrode 104 that are subsequently formed over the first electrode 102 also has the configuration similar to a cylinder. Moreover, the axis A-A' of the first electrode 102 is also the structural axis of the first dielectric layer 106, the second dielectric layer 108, the oxide layer 112, the magnetic layer 110 and the second electrode 104. In other words, the capacitor unit 200S substantially has a cylindrical shape. In accordance with some embodiments, the bottom surfaces of the first electrode 102, the first dielectric layer 106, the second dielectric layer 108, the oxide layer 112, the magnetic layer 110 and the second electrode 104 are substantially coplanar. In addition, in accordance with some embodiments, the capacitor unit 200S may be a nanowire structure.

On the other hand, in accordance with some embodiments, the manufacturing method of the capacitor unit 200S may include forming the first electrode 102 over the substrate 114 and the passivation layer 116 first, and then the first electrode 102 may be patterned to form a predetermined three-dimensional structure. Alternatively, in some other embodiments, the first electrode 102 may grow into a predetermined three-dimensional structure by a epitaxial growth process. Thereafter, the first dielectric layer 106, the second dielectric layer 108, the oxide layer 112, the magnetic layer 110 and the second electrode 104 are sequentially formed over the patterned first electrode 102. In accordance with some embodiments, the first dielectric layer 106, the second dielectric layer 108, the oxide layer 112, the magnetic layer 110 and the second electrode 104 are conformally formed over the first electrode 102. Furthermore, in accordance with some embodiments, the patterning process may include a photolithography process and an etching process. The photolithography process may include, but is not limited to, photoresist coating (e.g., spin-on coating), soft baking, hard baking, mask aligning, exposure, post-exposure baking, developing the photoresist, rinsing, drying, or other suitable processes. The etching process may include dry etching process or wet etching process.

Figure 2B:
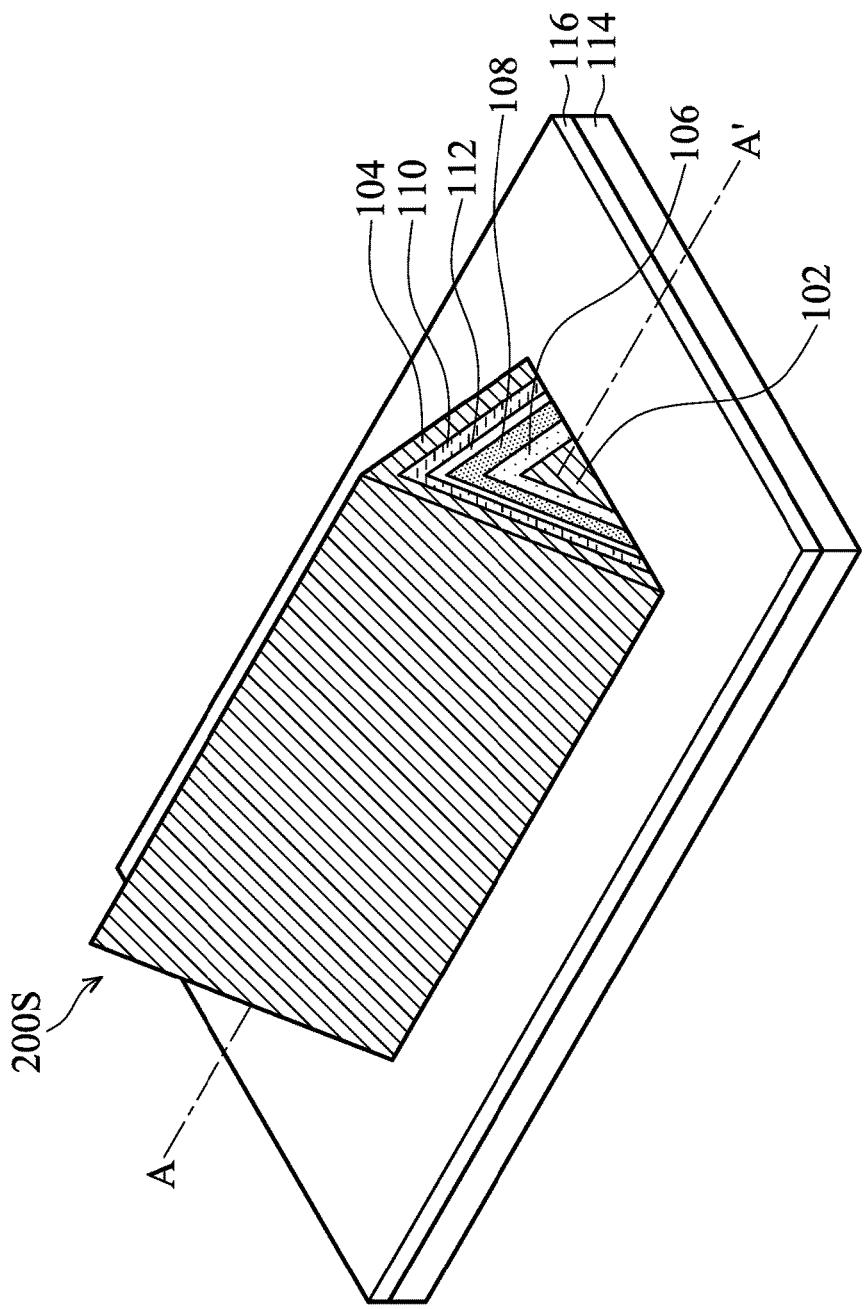
Figure 2C:
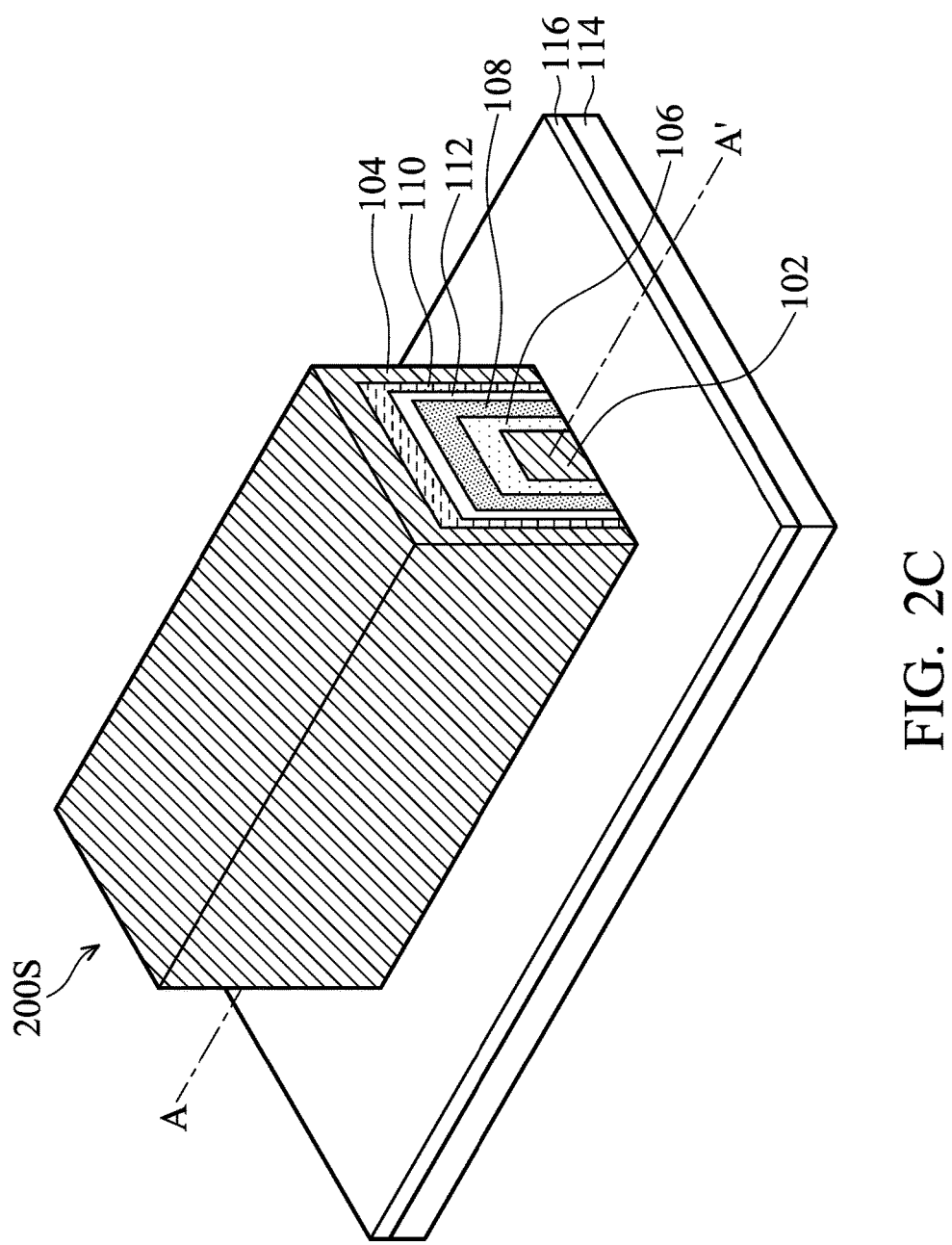
Figure 2D:
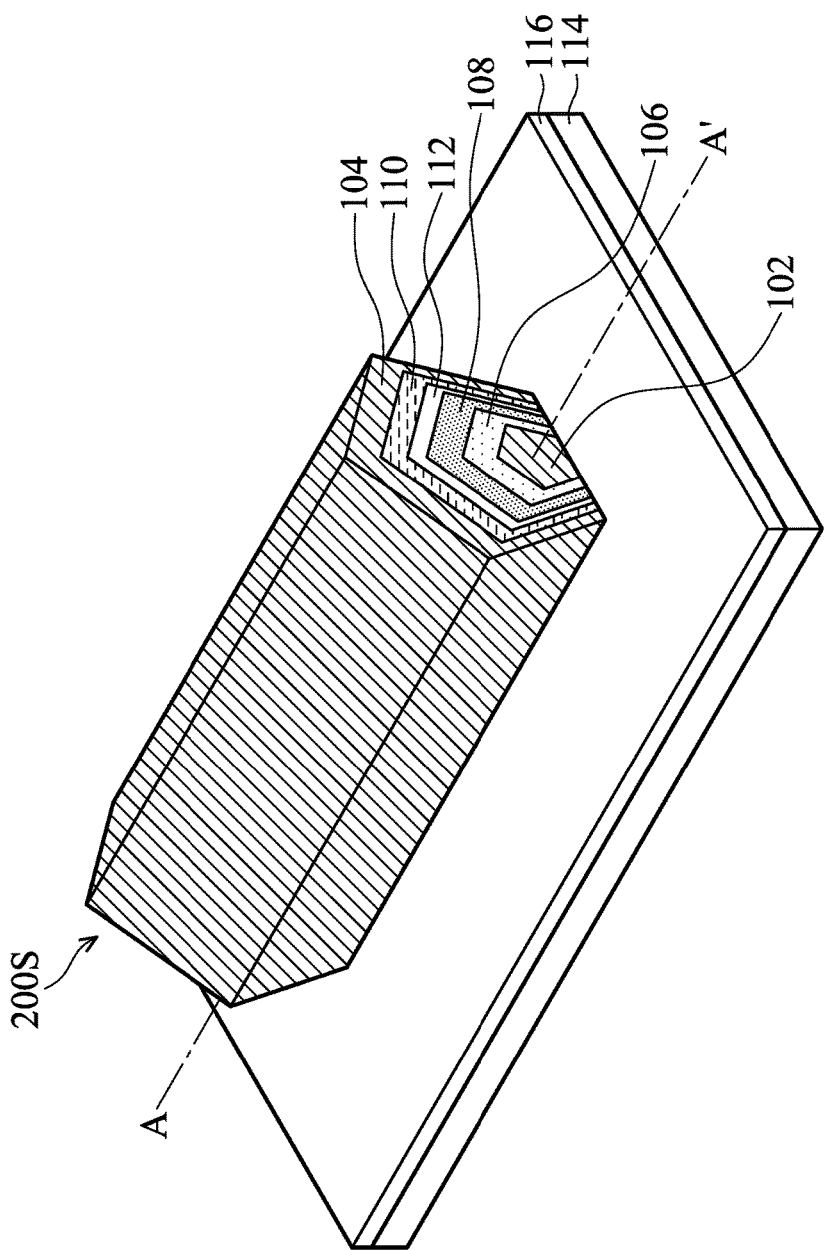
Figure 2E:
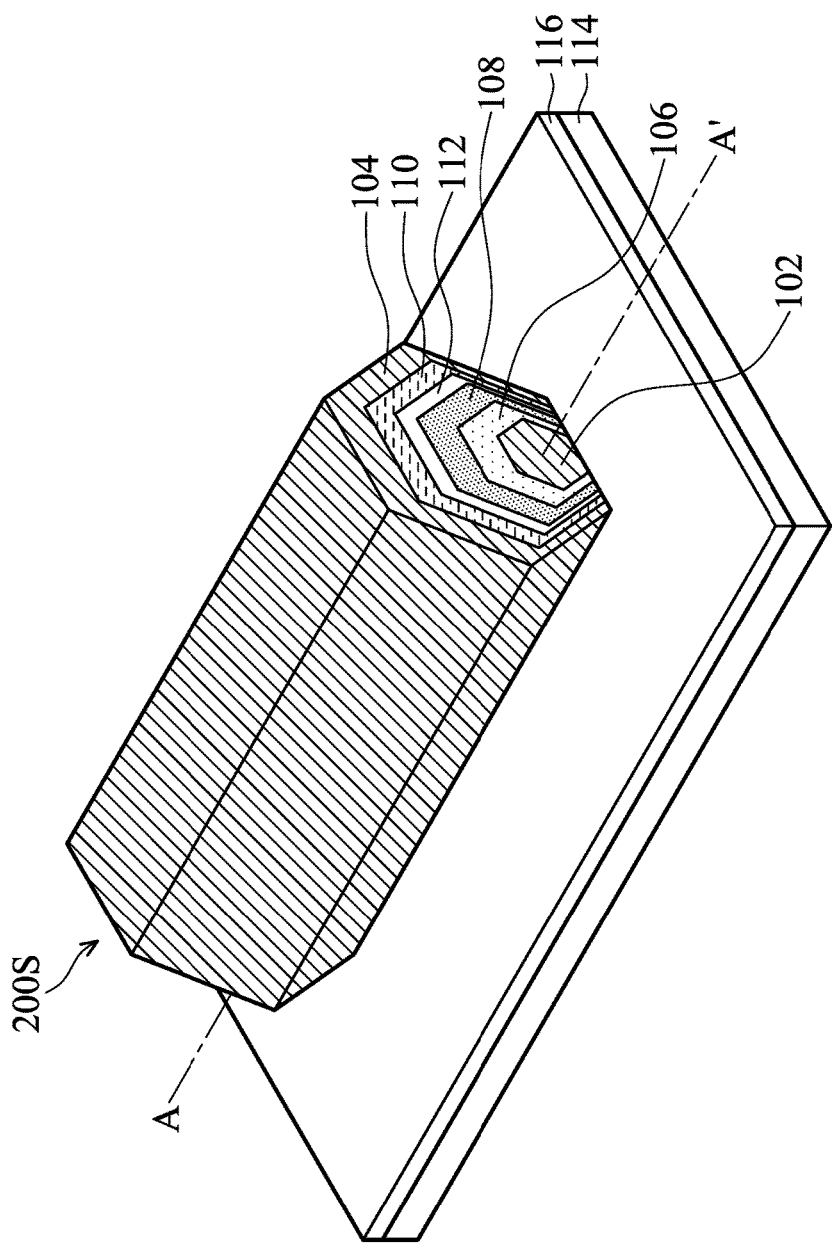
Figure 2F:
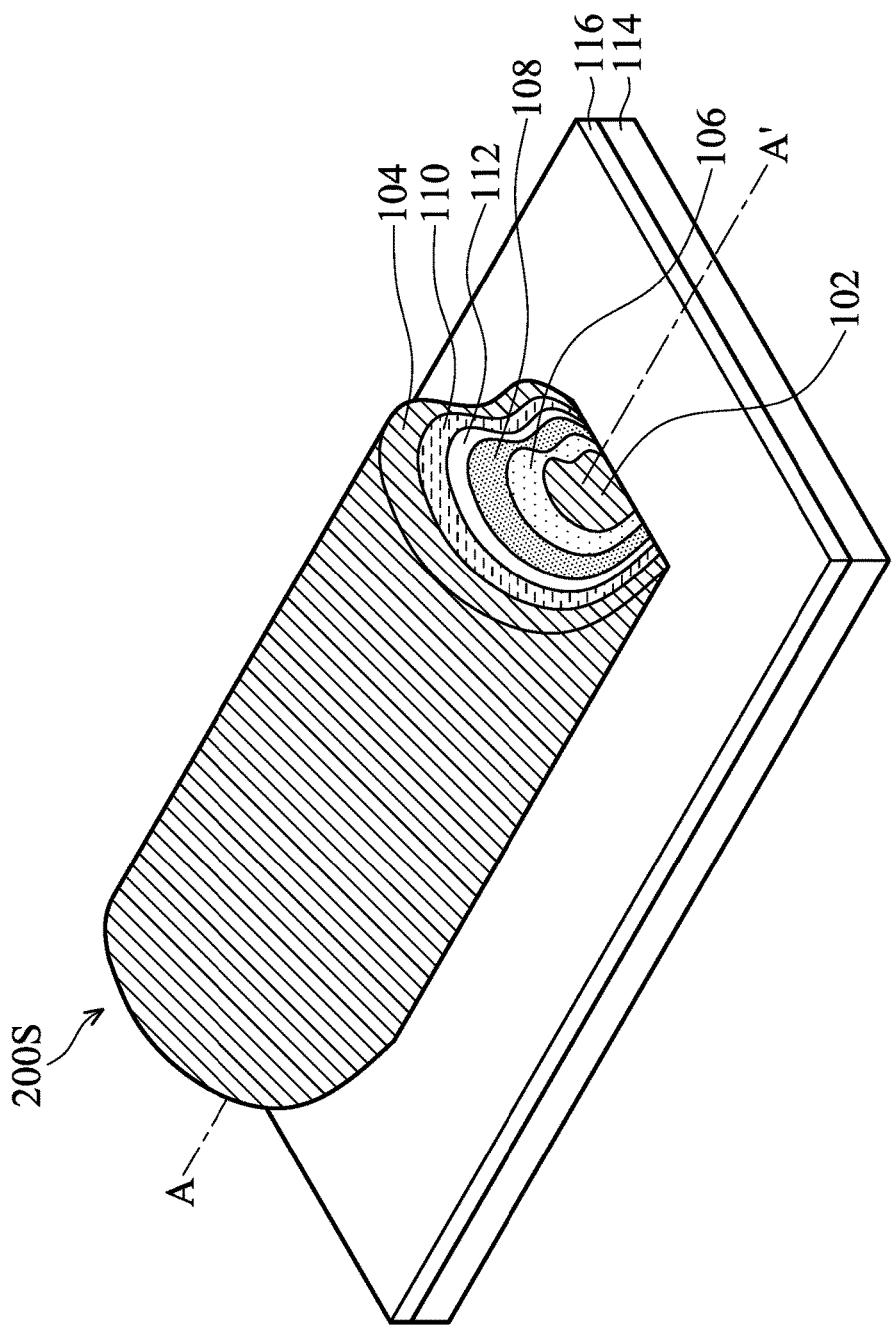

As shown in FIGS. 2B-2F, in some other embodiments, the capacitor unit 200S may be a three-dimensional structure having other shapes. For example, the capacitor unit 200S may substantially have a shape of triangular prism (as shown in FIG. 2B), tetragonal prism (as shown in FIG. 2C), pentagonal prism (as shown in FIG. 2D), hexagonal prism (as shown in FIG. 2E) or the column with an irregular cross section (as shown in FIG. 2F) and so on, but it is not limited thereto. The capacitor unit 200S may have any other suitable shapes according to the needs. In these embodiments, the first electrode 102, the first dielectric layer 106, the second dielectric layer 108, the oxide layer 112, the magnetic layer 110 and the second electrode 104 also are substantially coaxial.

Moreover, in accordance with some embodiments, the length L1 of the capacitor unit 200S along the Y direction (i.e. the longitudinal direction) may be in a range from about 10 µm to about 1000 µm, or form about 100 µm to about 300 µm. In accordance with some embodiments, the length L2 of the capacitor unit 200S along the X direction (i.e. the lateral direction) may be in a range from about 0.1 µm to about 10 µm, or from about 0.5 µm to about 1 µm.

As described above, as compared with the planar capacitor, the capacitor element having a three-dimensional structure may increase the contact area of the electrode within the same area of the substrate so that the capacitor element's ability to store a charge may be increased accordingly. For example, a planar capacitor has length 2r and width 2r, and a cylindrical (nanowire) capacitor has length 2r and diameter 2r. In cases where both the thickness and the dielectric constant of the dielectric layer of such a planar capacitor and such a cylindrical capacitor are the same, the capacitance value of the cylindrical capacitor is about three times the capacitance value of the planar capacitor.

Furthermore, the magnetic capacitor elements of the present disclosure may be manufactured by semiconductor processes. Therefore, the size of the magnetic capacitor elements can be arbitrarily miniaturized, enlarged, and may also prevent the security risks that may happen when chemicals are used.

A detailed description is given in the following particular embodiments. However, the scope of the present disclosure is not intended to be limited to the particular embodiments.

EXAMPLE—PREPARATION OF A CAPACITOR ELEMENT (Pt/FePt/MgO/BFO/BTO/Pt/TiO$_2$/SiO$_2$/Si)

First, titanium oxide (passivation layer) is formed over a silicon substrate by using a sputtering process. The steps of the sputtering process generally includes the following. The substrate is placed in a chamber. The chamber is evacuated by a pump to reach a vacuum of $1\times10^{-5}$ torr to $1\times10^{-7}$ torr. Next, inert gas is introduced into the chamber and the gas flow required by the process is adjusted by using the mass flow controller (MFC). Then, the power generator is turned on to perform the pre-sputtering. The pre-sputtering can remove the contaminants and oxides etc. on the target surface. After the pre-sputtering is finished and the required gas flow reaches a steady state, the shutter is opened to perform the sputtering growth (deposition) of the thin film. The sputtering growth of titanium oxide is performed by a radio frequency power generator. The parameters of the sputtering of titanium oxide are as follows: gas flow is from about 20 sccm to about 60 sccm, temperature is from about 15° C. to about 25° C., power is from about 30 W to about 60 W, base pressure is from about $3\times10^{-5}$ torr to about $3\times10^{-7}$ torr, working pressure is from about $3\times10^{-1}$ torr to about $3\times10^{-5}$ torr.

After the sputtering deposition of titanium oxide is finished, platinum (the first electrode) is formed over titanium oxide by using a sputtering process. The sputtering process of platinum is substantially similar to that of titanium oxide. The difference between them is that a DC power generator is used in the sputtering process of platinum. The parameters of the sputtering of platinum are as follows: gas flow is from about 40 sccm to about 150 sccm, temperature is from about 15° C. to about 25° C., power is from about 20 W to about 50 W, base pressure is from about $3\times10^{-5}$ torr to about $3\times10^{-7}$ torr, working pressure is from about $1\times10^{-1}$ torr to about $1\times10^{-5}$ torr.

Next, cubic phased barium titanate (c-BaTiO$_3$) (BTO) (the first dielectric layer) is formed over platinum by using a sputtering process. The sputtering process of cubic phased barium titanate is substantially similar to that of titanium oxide. The difference between them is that a DC power generator is used in the sputtering process of cubic phased barium titanate. The parameters of the sputtering of c-BaTiO$_3$ are as follows: gas flow is from about 20 sccm to about 60 sccm, temperature is from about 400° C. to about 700° C., power is from about 30 W to about 80 W, base pressure is from about $3\times10^{-5}$ torr to about $3\times10^{-7}$ torr, working pressure is from about $3\times10^{-1}$ torr to about $3\times10^{-5}$ torr.

Next, cubic phased bismuth ferrite (c-BiFeO$_3$) (BFO) (the second dielectric layer) is formed over cubic phased barium titanate by using a sputtering process. The sputtering process of cubic phased bismuth ferrite is substantially similar to that of titanium oxide. The difference between them is that a DC power generator is used in the sputtering process of cubic phased bismuth ferrite. The parameters of the sputtering of c-BiFeO$_3$ are as follows: gas flow is from about 20 sccm to about 60 sccm, temperature is from about 400° C. to about 700° C., power is from about 30 W to about 80 W, base pressure is from about $3\times10^{-5}$ torr to about $3\times10^{-7}$ torr, working pressure is from about $3\times10^{-1}$ torr to about $3\times10^{-5}$ torr.

Next, the chamber is evacuated by a pump to reach a vacuum of $1\times10^{-5}$ torr to $1\times10^{-7}$ torr. The chamber is heated to the temperature of 200° C. to 500° C. Then, inert gas is introduced into the chamber and the gas flow required by the process is adjusted by using the mass flow controller (MFC). Then, the power generator is turned on to perform the pre-sputtering. The pre-sputtering can remove the contaminants and oxides etc. on the target surface. After the pre-sputtering is finished and the required gas flow reaches a steady state, the shutter is opened to perform the sputtering growth of the magnesium oxide (the oxide layer). The parameters of the sputtering of magnesium oxide are as follows: gas flow is from about 20 sccm to about 60 sccm, temperature is from about 200° C. to about 500° C., power is from about 100 W to about 250 W, base pressure is from about $5\times10^{-5}$ torr to about $5\times10^{-7}$ torr, working pressure is from about $1\times10^{-2}$ torr to about $3\times10^{-5}$ torr.

After the sputtering deposition of magnesium oxide is finished, the plasma of the target of magnesium oxide is turned off. At the same time, the temperature of the chamber is heated up to 500° C.-800° C. again and iron-platinum alloy (FePt) (the magnetic layer) is formed over magnesium oxide by using a sputtering process. The sputtering process of iron-platinum alloy is substantially similar to that of magnesium oxide. The difference between them is that a DC power generator is used in the sputtering process of iron-platinum alloy. The parameters of the sputtering of FePt are as follows: gas flow is from about 40 sccm to about 200 sccm, temperature is from about 500° C. to about 800° C., the power of iron is from about 5 W to about 40 W and the power of platinum is from about 5 W to about 60 W, base pressure is from about $5\times10^{-5}$ torr to about $5\times10^{-7}$ torr, working pressure is from about $1\times10^{-1}$ torr to about $1\times10^{-5}$ torr.

After the sputtering process of magnesium oxide is finished, a rapid thermal annealing (RTA) is performed in the temperature ranging from 500° C. to 800° C. so that magnesium oxide may have better crystallinity and order.

Then, platinum (the second electrode) is formed over iron-platinum alloy by using a sputtering process. The sputtering process of platinum is substantially similar to that as described above. The parameters of the sputtering of platinum are as follows: gas flow is from about 40 sccm to about 150 sccm, temperature is from about 15° C. to about 25° C., power is from about 20 W to about 50 W, base pressure is from about $3\times10^{-5}$ torr to about $3\times10^{-7}$ torr, working pressure is from about $1\times10^{-1}$ torr to about $1\times10^{-5}$ torr.

As such, the preparation of the capacitor element (Pt/FePt/MgO/c-BiFeO$_3$/c-BaTiO$_3$/Pt/TiO$_2$/SiO$_2$/Si) in accordance with this example is completed.

Comparative Example 1—Preparation of a Capacitor Element (Pt/BTO/Pt/TiO$_2$/SiO$_2$/Si)

The preparation of the capacitor element of Comparative Example 1 is substantially the same as that of the Example described above. The prepared capacitor element includes the multilayered structure as follows: Pt/c-BaTiO$_3$/Pt/TiO$_2$/SiO$_2$/Si).

Comparative Example 2—Preparation of a Capacitor Element (Pt/BTO/BFO/Pt/TiO$_2$/SiO$_2$/Si)

The preparation of the capacitor element of Comparative Example 2 is substantially the same as that in the Example described above. The prepared capacitor element includes the multilayered structure as follows: Pt/c-BaTiO$_3$/c-BiFeO$_3$/Pt/TiO$_2$/SiO$_2$/Si).

Comparative Example 3—Preparation of a Capacitor Element (Pt/FePt/MgO/BTO/Pt/TiO$_2$/SiO$_2$/Si)

The preparation of the capacitor element of Comparative Example 3 is substantially the same as that in the Example described above. The prepared capacitor element includes the multilayered structure as follows: Pt/FePt/MgO/c-BaTiO$_3$/Pt/TiO$_2$/SiO$_2$/Si.

Performance Test of the Capacitor Elements

Figure 3:
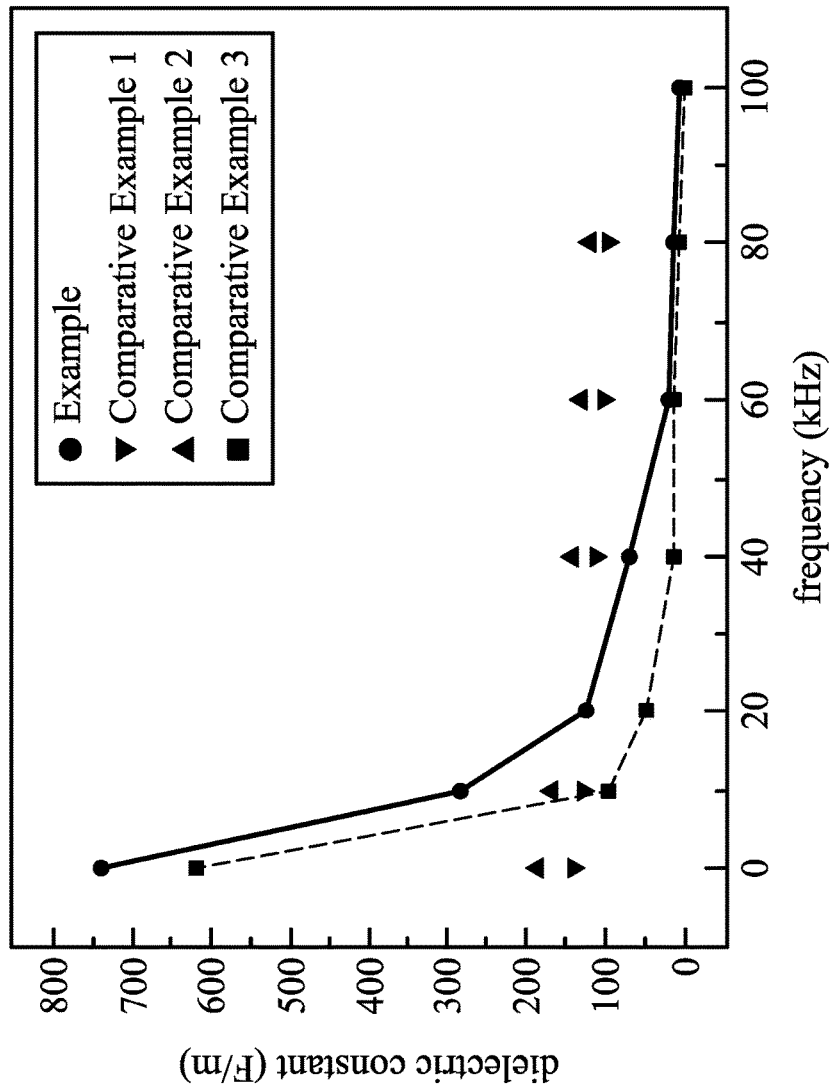
FIG. 3 illustrates the performance test of dielectric constants of the magnetic capacitor element in accordance with some embodiments of the present disclosure.

The performance test regarding the dielectric constant of the dielectric layer is conducted on the capacitor elements that are prepared by Example and Comparative Examples 1-3. The result is shown in FIG. 3.

According to the results of Example and Comparative Examples 1 and 2, it is known that the dielectric constant of the capacitor element having the magnetic layer increases about 3-5 fold in the range of 0-20 kHz compared with the capacitor element without the magnetic layer. In addition, according to the results of the Example and Comparative Example 3, it is known that the dielectric constant of the capacitor element having the magnetic layer, and the adjacent first and second dielectric layers increases about 1.5-4 fold in the range of 0-40 kHz compared with the capacitor element only having the magnetic layer, and the first or second dielectric layer. This result is mainly caused by the colossal magnetocapacitance effect and the interface charge coupling effect.

In particular, vertical magnetic moments produced in the magnetic layer and the colossal magnetocapacitance effect between the ferroelectric dielectric layers will maintain their contribution of charge polarization to the dielectric constant below 40 kHz due to the influence of the magnetic field produced by the magnetic layer. In addition, the magnetic field may also affect the charge polarization in this frequency range, and thus make the arrangement of the unbalanced charges, which exist among the internal atoms and dislocated ions of the ferroelectric dielectric layer, more ordered. Accordingly, more charge polarization can be produced and the capacitance value in this frequency range is increased. However, such a phenomenon will disappear as the frequency continues to increase. As the charge polarization mechanism cannot keep up with the change of frequency, the dielectric constant of the capacitor element decreases subsequently.

In addition, the first dielectric layer normally includes ferroelectric materials. The ferroelectric material generally does not possess ferromagnetic properties while the second dielectric layer having a specific thickness over the first dielectric layer usually includes ferromagnetic or antiferromagnetic materials. Interface spin-polarized electrons will be generated between the first dielectric layer and the second dielectric layer, and ferroelectric inversion will occur, which further enhances the polarization of the internal charges in the dielectric layer. Meanwhile, the interface stress caused by the lattice mismatch existing in the first dielectric layer and the second dielectric layer will also further change the ferromagnetic anisotropy of the material. Accordingly, the spin direction of electrons in the first dielectric layer and the second dielectric layer will be changed, and charge polarization is then enhanced by magnetoelectric coupling.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A magnetic capacitor element, comprising:
a first electrode;
a second electrode disposed opposite to the first electrode;
a first dielectric layer disposed between the first electrode and the second electrode;
a second dielectric layer disposed between the first dielectric layer and the second electrode;
a magnetic layer disposed between the second electrode and the second dielectric layer; and
an oxide layer disposed between the second dielectric layer and the magnetic layer, wherein the first dielectric layer comprises ferroelectric materials and the second dielectric layer comprises ferromagnetic materials or antiferromagnetic materials.

2. The magnetic capacitor element as claimed in claim 1, wherein the first electrode and the second electrode each comprise platinum, gold, copper, aluminum, platinum alloys, gold alloys, copper alloys, aluminum alloys, or a combination thereof.

3. The magnetic capacitor element as claimed in claim 1, wherein the first dielectric layer comprises cadmium chromium sulfide (CdCrS$_4$, CdCr$_2$S$_4$), strontium titanate (SrTiO$_3$), barium titanate (BaTiO$_3$(BTO)), lead zirconate titanate (PbZr$_x$Ti$_{1-x}$, 0≤x≤1), lead lanthanate titanate (Pb$_x$La$_{1-x}$TiO$_3$, 0≤x≤1), bismuth titanate (Bi$_{12}$TiO$_{20}$, Bi$_4$Ti$_3$O$_{12}$, Bi$_2$Ti$_2$O$_7$), or a combination thereof, and the second dielectric layer comprises yttrium ferrite (YFeO$_3$), bismuth ferrite (BiFeO$_3$(BFO)), or a combination thereof.

4. The magnetic capacitor element as claimed in claim 1, wherein the crystalline phase of the first dielectric layer and the second dielectric layer each comprise amorphous phase, cubic phase, tetragonal phase, or a combination thereof.

5. The magnetic capacitor element as claimed in claim 1, wherein the first dielectric layer is in contact with the second dielectric layer.

6. The magnetic capacitor element as claimed in claim 1, wherein the magnetic layer comprises iron-platinum alloys (FePt), cobalt-platinum alloys (CoPt), or a combination thereof.

7. The magnetic capacitor element as claimed in claim 1, wherein the oxide layer comprises magnesium oxide, nickel oxide, lanthanum strontium manganite (LSMO), lead zirconate titanate (PZT), or a combination thereof.

8. The magnetic capacitor element as claimed in claim 1, wherein the first electrode, the second electrode, the first dielectric layer, the second dielectric layer, the magnetic layer and the oxide layer are coaxial.

9. The magnetic capacitor element as claimed in claim 1, wherein the first electrode, the second electrode, the first dielectric layer, the second dielectric layer, the magnetic layer and the oxide layer are three-dimensionally coaxial.

10. The magnetic capacitor element as claimed in claim 9, wherein the bottom surfaces of the first electrode, the second electrode, the first dielectric layer, the second dielectric layer, the magnetic layer and the oxide layer are coplanar.

11. The magnetic capacitor element as claimed in claim 1, further comprising:
   a substrate, wherein the substrate and the second electrode are disposed at opposite sides of the first electrode; and
   a passivation layer disposed between the substrate and the first electrode.

* * * * *